Patented Oct. 5, 1948

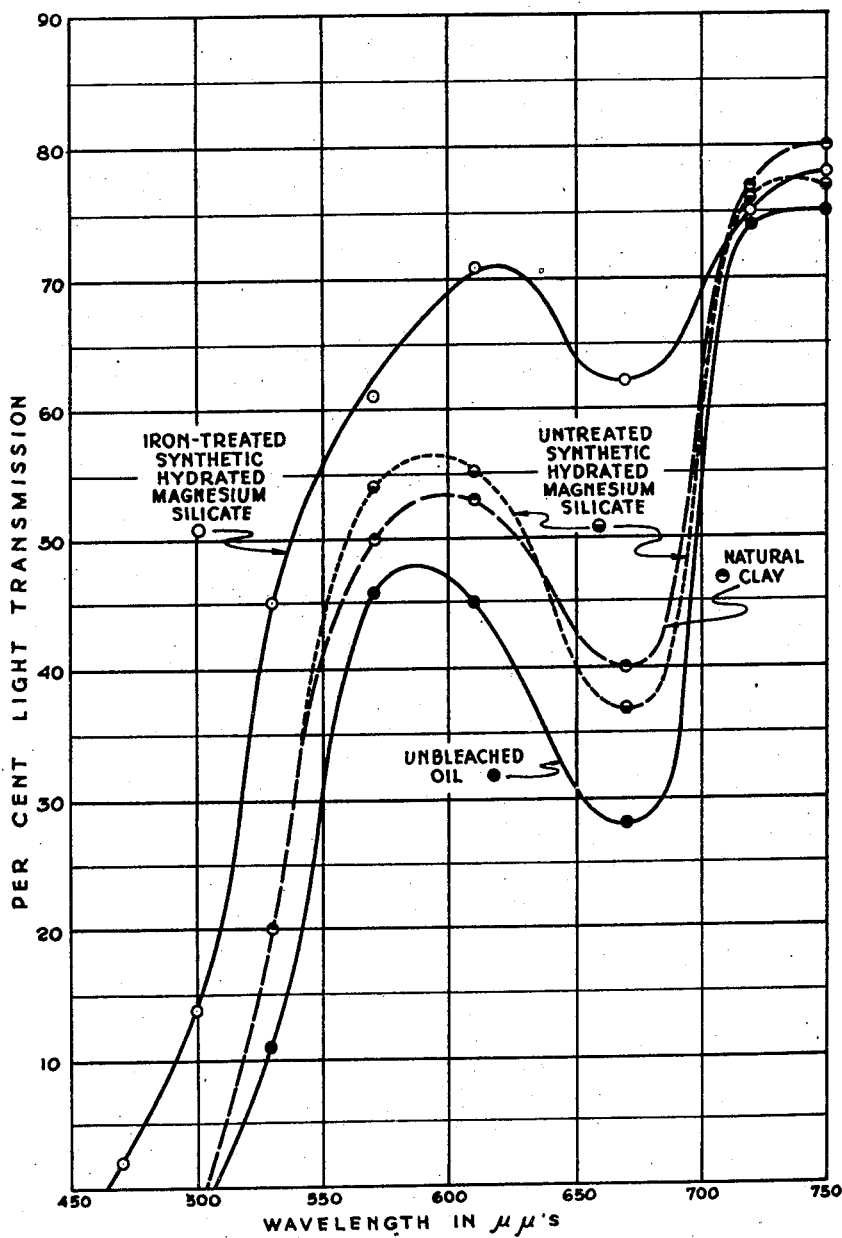

2,450,549

UNITED STATES PATENT OFFICE 2,450,549

DECOLORIZING VEGETABLE OILS WITH FERRIC SALTS AND SILICATES

Alexander Greentree, Paulsboro, N. J., assignor, by mesne assignments, to Lyle Caldwell, Los Angeles, Calif.

Application November 24, 1944, Serial No. 564,977

4 Claims. (Cl. 260—428)

1

This invention relates to the decolorizing of vegetable oils, and particularly to the decolorizing of such oils by contact with an improved decolorizing composition prepared by treatment of a synthetic hydrated magnesium silicate adsorbent material.

The principal object of this invention is to provide for the removal of a large proportion of color from vegetable oils by contact with a decolorizing composition having enhanced decolorizing power and prepared by special treatment of a synthetic hydrated magnesium silicate material which itself has important adsorbent characteristics.

This application is a continuation-in-part of my application Ser. No. 393,118, filed May 12, 1941, allowed June 21, 1944, now Patent No. 2,367,496 of January 16, 1945.

I am aware that prior investigators in the art have proposed the treatment of an oil with a mixture of a soluble iron compound and a decolorizing material of the character of fuller's earth, whereby the iron compound functions as an electrolyte to facilitate the agglomeration of contaminant coloring matter in the oil, and that it has been suggested that a clay material may be caused to have improved properties with respect to the removal of sulphur and sulphur compounds from petroleum oils, by the incorporation therein of soluble compounds of metals having an affinity for sulphur, followed, if desired, by a roasting treatment to convert such metals to the oxide form.

The essential concept of my invention is that of contacting the vegetable oil with a decolorizing composition prepared by incorporating a soluble iron compound with a particular type of adsorbent material, i. e., a synthetic hydrated magnesium silicate having important decolorizing properties, preferably using a ferrous compound under conditions such as will convert the principal proportion of the iron of the ferrous compound from ferrous to ferric condition, for the specific purpose of improving the decolorizing property of the material. I have found that similar treatment of other known types of decolorizing materials is not productive of equivalent results, and, further, that incorporation of the iron compound in ferrous condition with concurrent or subsequent at least partial oxidation is materially more effective in enhancing the decolorizing characteristics of the synthetic magnesium silicate base material than is the incorporation of an iron compound in ferric condition. The physical or chemical reasons for these observed facts are not at present fully known to me.

The method of treatment described herein is particularly applicable to synthetic hydrated magnesium silicate adsorbent materials of the type prepared by the methods described in United States Patents 2,076,545, 2,163,525, 2,163,526, and 2,163,527 granted to Lyle Caldwell, which are themselves active adsorbents and have good decolorizing properties. Such hydrated magnesium silicate materials are prepared by hydrothermal reaction (i. e., by chemical reaction in the presence of water at a superatmospheric temperature), preferably under conditions of agitation, between a soluble magnesium compound and solid starting material containing lime and silica, said solid starting material comprising either a single material in which the lime and silica are chemically combined with one another at the start of the reaction, or a mixture of two or more materials containing lime and silica wholly or partly uncombined with one another at the start of the reaction.

The reaction for the production of the hydrated magnesium silicate may be carried out by simply boiling the mixture at atmospheric pressure or by heating the mixture at any other temperature which is practicable, or may be carried out at a faster rate by heating the mixture to a higher temperature under superatmospheric pressure, as in an autoclave or other pressure equipment.

The proportion of magnesium oxide to silica in the hydrated magnesium silicate material so produced will be dependent upon the ratio between the lime and silica present (either chemically combined with one another or wholly or partly uncombined with one another) in the starting mix, and upon the quantity of soluble magnesium compound employed. Any one of a number of starting materials may be employed and, in general, the soluble magnesium compound is preferably employed in an amount that is approximately stoichiometrically equivalent or in excess of the lime present in the starting mix. The silica combines chemically with the magnesium to form the desired hydrated magnesium silicate material, and the calcium combines with the anion of the magnesium compound. If the lime and silica are present in chemical combination as calcium silicate in the starting mix, the reaction may be described as a hydrothermal base-exchange reaction in which the magnesium replaces the calcium in the silicate compound to form magnesium silicate, and the replaced calcium combines with the anion of the magnesium compound. The resulting calcium compound may be either water soluble, as in the case of calcium chloride when magnesium chloride is used in the reaction, or substantially water insoluble, as in the case of calcium sulphate when magnesium sulphate is employed.

Various types of calcium silicate materials may be used as starting materials for preparing the hydrated magnesium silicate by the hydrothermal base-exchange method above described. The following examples are illustrative:

(1) A quantity of material comprising anhydrous calcium silicate, such as wollastonite or other mineral or a synthetic material produced by fusion of lime and silica, preferably in finely divided form, is mixed with an aqueous solution of magnesium chloride containing some excess of magnesium over that required to replace the calcium, and subjected to autoclaving at a temperature approximately 250° C. for a period of about one and one-half hours, preferably under conditions of agitation.

(2) A hydrated calcium silicate is prepared, for example, by direct precipitation through reaction of calcium chloride and an alkali metal silicate in aqueous solution, or by hydrothermal reaction between lime and silica. A quantity of this hydrated calcium silicate is mixed with an excess of magnesium chloride solution and heated at a superatmospheric temperature, for example, by boiling at atmospheric temperature, until the reaction is substantially complete.

The following example illustrates the preparation of hydrated magnesium silicate from starting material containing lime and silica uncombined with one another at the start of the reaction:

(3) A mixture containing 300 parts of lime (calcium hydroxide), 200 parts of finely ground silica, 600 parts of magnesium chloride, and 2500 parts of water, is heated for about two hours, with active agitation and under superatmospheric pressure, at an average temperature of 225° C.

In each of the above examples, the resulting hydrated magnesium silicate is separated from the solution, as by filtering, and is preferably washed with water to remove the calcium chloride formed in the reaction. If desired, the product may then be dried in any suitable manner and subjected to grinding or other operation to convert it to the desired particle size. However, when the magnesium silicate is to be further treated as described herein for enhancing its decolorizing properties, it is not necessary to dry it at this stage of the process, and the further treatment may be applied to the material following filtering and washing.

Magnesium sulphate may be employed instead of magnesium chloride in any of the above examples, resulting in the formation of relatively insoluble calcium sulphate as a reaction product. In such cases, this calcium sulphate is principally recovered with the magnesium silicate, but its presence is not objectionable in most cases in view of its relatively inert nature.

Reference is made to the above-mentioned Caldwell patents for more detailed descriptions and additional examples of methods of preparing synthetic hydrated magnesium silicate materials of this type.

In the production of a decolorizing composition for use in accordance with the present invention, a synthetic hydrated magnesium silicate decolorizing material, preferably prepared by one of the general methods described above, is subjected, while in finely divided condition or in granular, pelleted or other form, to contact with a suitable proportion of a water-soluble iron compound in aqueous solution, causing the iron salt to become intimately associated with the particles of said material. The material is thereafter dried in any suitable manner to produce a solid product having enhanced decolorizing properties, said product containing an iron compound in intimate association with the particles of magnesium silicate material and being substantially dry or having any desired moisture content. The treatment is preferably so conducted that the iron contained in the finished product is at least partly in ferric condition, and more preferably is substantially wholly in ferric condition. As noted above, the best results are obtained by contacting the material with a solution of a ferrous salt and causing oxidation thereof to ferric condition during such contact step or the subsequent drying step or both.

A specific example of the preparation of such a decolorizing composition is as follows:

To a slurry of 24 parts (dry basis) of a finely divided synthetic hydrated magnesium silicate (prepared by one of the methods described above) and 136 parts of water, I add 1.2 parts of $FeCl_2$ dissolved in 9 parts of water. The resulting slurry is thoroughly mixed and dried in contact with atmospheric or other oxygen, to a preferred moisture content, which may be varied between zero and 20% in the same manner and for the same reasons as are encountered in the production of any inorganic adsorbent material as is well known in the art.

In the above example, 5% of the ferrous salt (equivalent to 2.2% Fe) on the basis of the dry base material (synthetic hydrated magnesium silicate) was employed. The amount of $FeCl_2$ added may be varied considerably, for example between 0.3 part and about 6 parts in the above example, with the optimum generally between 0.6 part and about 3 parts. I have found that $FeSO_4$ (added as $FeSO_4 \cdot 7H_2O$ for example) is a full equivalent of $FeCl_2$, and other soluble or sparingly soluble ferrous compounds may also be used, for example, ferrous oxalate. The proportion of iron salt used should, in general, be such as to provide from about 0.5% to about 10% of iron in the final iron-treated composition, on a moisture-free basis. A more preferred range, in which the objects of the present invention are generally attained to the greatest degree, is a final iron content of from about 1% to about 5% on a moisture-free basis.

The concentration of the ferrous compound in solution seems not to be critical, and the slurry concentration may be varied within economic limits as to facility of intermixing on the one hand and the necessity for drying on the other hand (subject, of course, to the limit of solubility of the iron compound), without detriment to the properties of the finished product.

During the contact of the base material (the synthetic hydrated magnesium silicate) with the iron salt in aqueous solution, the iron salt becomes intimately associated with the particles of synthetic hydrated magnesium silicate base material. Whether the iron compound reacts chemically therewith, or is merely adsorbed thereon, is not definitely known, but tests on the contacted base material, prior to drying, indicate that this intimate association is substantially non-reversible. Extraction with water, for example, gives a negative iron test. Since the iron salt is applied to contact with the base material when in water solution, however, this intimate association may be the result of any one or any combination of the following possibilities:

(1) Chemical reaction may take place between the silicate material and the iron salt, resulting in the production of an insoluble iron-containing reaction product;

(2) The iron salt may undergo chemical transformation, as by hydrolysis, which transformation might be facilitated by the tremendous surface area of the silicate material; and/or (3) The iron salt may be so strongly adsorbed on the silicate material that it cannot be desorbed in water to an extent which will permit detection.

To ascribe the observed results as resultant primarily from any particular one of these possibilities is quite difficult. It has been determined, however, that when a ferrous salt is employed in the treatment of the synthetic silicate material, the final product when dried in the air contains only ferric iron; when oxygen-containing air is excluded from the drying operation, however, approximately three-fourths of the iron is found to be in ferric condition, indicating that an appreciable oxidation is obtained during the contact step. This would point to possibility (2) above. The decolorizing characteristics of the three-quarters oxidized and fully oxidized products were substantially equivalent.

Considerable improvement in the decolorizing properties of the synthetic hydrated magnesium silicate decolorizing material may be obtained by treating the base material with a water-soluble ferric salt in water solution, as with ferric chloride or the like. The improvement resulting from treatment with FeCl₃ in the manner set forth above in the case of FeCl₂, is approximately 50% of that obtained with FeCl₂ or FeSO₄. The treatment with ferric chloride or other ferric salt may, if desired, be followed by contact of the material with an alkali-metal hydroxide solution to convert the iron content of the ferric salt to Fe(OH)₃, followed by drying.

The improved decolorizing materials described above are highly effective in the removal of color from vegetable oils, such as raw linseed oil or cottonseed oil, and the like, using the same general procedure as is conventionally used for removing color from such oils with other adsorbent decolorizing materials. This decolorizing treatment may be carried out, for example, by subjecting the oil to contact at a suitable temperature with a quantity of the decolorizing composition in finely divided condition, and then separating the material containing adsorbed coloring matter from the oil, as by filtration. The contact is usually carried out under conditions of agitation and at temperatures above atmospheric. In some cases it may be desirable to use the decolorizing composition in granular or pelleted form, in which case the oil may be contacted therewith by passing it through a pervious bed or column of such material.

The improved color removal obtained by the use of the improved decolorizing composition resulting from the treatment with iron salts in accordance with this invention is illustrated by results of tests in which a synthetic hydrated magnesium silicate was subjected to treatment with different proportions of ferrous salt as described above, and the increase in bleaching efficiency determined. The hydrated magnesium silicate was produced by subjecting a precipitated calcium silicate, prepared by reaction between calcium chloride and sodium silicate in aqueous solution, to hydrothermal base-exchange reaction with magnesium chloride.

Typical data on the effect of varying quantities of ferrous salt on the bleaching efficiency of the product, for the bleaching of two different cottonseed oils, are as follows:

| Percent Fe Used in Making Decolorizing Composition (Dry Basis) | Lovibond Colors Y-R | | | |
|---|---|---|---|---|
| | Cottonseed Oil No. 1 (2% of Decolorizing Composition) | | Cottonseed Oil No. 2 (1% of Decolorizing Composition) | |
| | Yellow | Red | Yellow | Red |
| 0.0 | 25 | 3.6 | 25 | 2.9 |
| 1.0 | 25 | 3.3 | 25 | 2.3 |
| 2.1 | 25 | 3.2 | 25 | 2.1 |
| 4.4 | 25 | 3.4 | 25 | 2.3 |
| Orig. Oil | 35 | 10.5 | 35 | 5.1 |

Contact—10 min. at 230° F.

The accompanying graph illustrates the relative color removing properties of (1) one of the most widely used commercial natural clays, (2) a synthetic hydrated magnesium silicate adsorbent produced as described above, and (3) a decolorizing material prepared by treatment of the same synthetic hydrated magnesium silicate with 9% FeSO₄ (3.3% Fe) in accordance with this invention. This chart is based on data obtained with a Zeiss-Pulfrich photometer, on a linseed oil and the same oil treated with the three different materials, respectively.

This graph fails to illustrate one significant property of adsorbents prepared according to this invention, i. e., that of readily reducing the color of highly colored oils to a commercially satisfactory level, while in the case of ordinary clays no practical amount will so reduce the color. The following table illustrates this property, in terms of Lovibond scale colors, with a highly colored cottonseed oil, using various amounts of adsorbent, at a ten minute contact, 230° F. treatment for each. The "natural" clay is one of the most widely used natural clays in the United States, and the "present composition" is a synthetic hydrated magnesium silicate produced as described above, treated with 9% FeSO₄ (3.3% Fe).

| Per Cent Absorbent used | Lovibond Colors | | | |
|---|---|---|---|---|
| | Using Natural Clay | | Using Present Composition | |
| | Yellow | Red | Yellow | Red |
| 0 | 35 | 11.7 | 35 | 11.7 |
| 1 | 35 | 6.5 | 30 | 4.7 |
| 2 | 35 | 4.9 | 30 | 3.1 |
| 3 | 35 | 4.5 | 20 | 2.1 |
| 6 | 25 | 3.4 | | |

From the above, those skilled in the art will recognize that the color reduction obtained by using as much as 6% of the natural decolorizing clay is not sufficiently great to meet commercial demands for a properly decolorized cottonseed oil, while the color improvement with but 3% of the composition described herein is well within the range of commercial requirements. In general, in treating an oil such that a satisfactory color can be obtained with a natural clay if a sufficient amount is employed, I have found that one must use from 1.5 to 3 times, depending upon the oil being treated, as much natural clay to secure the same color reduction as is obtainable with a nominal amount of the composition described herein.

The following additional test data illustrate further the high degree of decolorizing action of compositions prepared as described above, using ferrous sulphate as the treating agent. The compositions used included a synthetic hydrated magnesium silicate prepared as described above, and the same material treated wtih ferrous sulphate and containing varying amounts of iron. These compositions were tested on caustic refined cottonseed oil and raw linseed oil, using a contact time of 10 minutes at a temperature of 220° F.

| Percent Fe in Decolorizing Composition (Dry Basis) | Lovibond Colors | | | | | |
|---|---|---|---|---|---|---|
| | Caustic Refined Cottonseed (5¼" Lovibond Cell) | | | | Raw Linseed (2" Lovibond Cell) | |
| | 1% of Decolorizing Composition | | 2% of Decolorizing Composition | | 6% of Decolorizing Composition | |
| | Yellow | Red | Yellow | Red | Yellow | Red |
| None | 25 | 3.2 | 25 | 2.9 | 25 | 3.2 |
| 1 | 25 | 2.6 | 25 | 2.2 | 25 | 1.8 |
| 2 | | | | | 25 | 1.7 |
| 3 | 25 | 2.6 | 25 | 2.2 | 25 | 1.6 |
| 4 | | | | | 25 | 1.7 |
| 5 | 25 | 2.6 | 25 | 2.2 | 25 | 1.8 |
| 7.5 | 25 | 2.6 | 25 | 2.4 | | |
| 10 | 25 | 3.2 | 25 | 2.5 | | |
| Orig. Oil | 35 | 5.5 | 35 | 5.5 | 100 | 6.0 |

The above examples of the practice of this invention are to be taken as illustrative rather than limitative, the scope of this invention being expressed in the subjoined claims.

I claim:

1. In a method of decolorizing vegetable oil, the step which comprises contacting such an oil with a decolorizing composition prepared by treating particles of hydrated magnesium silicate adsorbent material with a water-soluble ferrous salt in aqueous solution to cause said ferrous salt to become intimately associated with the particles of said material and then drying the treated material under conditions causing oxidation of the principal proportion of the iron to ferric condition, said composition containing from about 0.5% to about 10% of iron on a dry weight basis.

2. In a method of decolorizing vegetable oil, the step which comprises contacting such an oil with a decolorizing composition prepared by treating particles of hydrated magnesium silicate adsorbent material with a water-soluble ferric salt in aqueous solution to cause said ferric salt to become intimately associated with the particles of said material and then drying the treated material, said composition containing from about 0.5% to about 10% of iron on a dry weight basis.

3. In a method of decolorizing vegetable oil, the step which comprises contacting such an oil with a decolorizing composition prepared by treating particles of hydrated magnesium silicate adsorbent material with a water-soluble ferric salt in aqueous solution to cause said ferric salt to become intimately associated with the particles of said material and subjecting the treated material to contact with an alkali metal hydroxide to cause formation of ferric hydroxide within the material and then drying the treated material, said composition containing from about 0.5% to about 10% of iron on a dry weight basis.

4. In a method of decolorizing vegetable oil, the step which comprises contacting such an oil with a decolorizing composition prepared by subjecting solid material containing lime and silica to reaction with a soluble magnesium compound in the presence of water at a superatmospheric temperature to produce a hydrated magnesium silicate adsorbent material and treating said adsorbent material with a water-soluble ferric salt in aqueous solution to cause said ferric salt to become intimately associated with the particles of said material and then drying the material so treated, said composition containing from about 0.5% to about 10% of iron on a dry weight basis.

ALEXANDER GREENTREE.

REFERENCES CITED

The following references are of record in the file of this patent:

UNITED STATES PATENTS

| Number | Name | Date |
|---|---|---|
| 2,367,496 | Greentree | Jan. 16, 1945 |

FOREIGN PATENTS

| Number | Country | Date |
|---|---|---|
| 431,845 | Germany | July 17, 1926 |